(12) United States Patent
Critsinelis et al.

(10) Patent No.: US 12,228,463 B2
(45) Date of Patent: Feb. 18, 2025

(54) DEVICE FOR MONITORING STRAIN OF AN ELONGATE UNDERWATER MEMBER

(71) Applicants: Advanced Innergy Limited, Gloucester (GB); Chevron U.S.A. Inc., San Ramon, CA (US)

(72) Inventors: Antonio Critsinelis, Houston, TX (US); Yiannis Constantinides, Katy, TX (US); Will Twelvetrees, Skelmersdale (GB); Sid Mebarkia, Sugar Land, TX (US); Austin Harbison, Skelmersdale (GB)

(73) Assignees: CHEVRON U.S.A. INC., San Ramon, CA (US); ADVANCED INNERGY LIMITED, Gloucester (GB)

( * ) Notice: Subject to any disclaimer, the term of this patent is extended or adjusted under 35 U.S.C. 154(b) by 164 days.

(21) Appl. No.: 17/904,268

(22) PCT Filed: Feb. 11, 2021

(86) PCT No.: PCT/GB2021/050331
§ 371 (c)(1),
(2) Date: Aug. 15, 2022

(87) PCT Pub. No.: WO2021/161025
PCT Pub. Date: Aug. 19, 2021

(65) Prior Publication Data
US 2023/0089102 A1   Mar. 23, 2023

(30) Foreign Application Priority Data

Feb. 14, 2020 (GB) ..................................... 2002029

(51) Int. Cl.
*G01L 1/10* (2006.01)
*E21B 17/01* (2006.01)
(Continued)

(52) U.S. Cl.
CPC .............. *G01L 1/106* (2013.01); *E21B 17/01* (2013.01); *E21B 47/001* (2020.05);
(Continued)

(58) Field of Classification Search
None
See application file for complete search history.

(56) References Cited

U.S. PATENT DOCUMENTS 4,663,975 A    5/1987  Parkinson
2008/0303382 A1   12/2008  Edwards, Jr.

FOREIGN PATENT DOCUMENTS

CN   108072352 A   5/2018
CN   208366511 U   1/2019
(Continued)

OTHER PUBLICATIONS

GB Search Report mailed on Jul. 20, 2020, issued in GB Application No. GB2002029.3, filed on Feb. 14, 2020, 6 pages.
(Continued)

*Primary Examiner* — Daniel S Larkin
(74) *Attorney, Agent, or Firm* — King & Spalding LLP

(57) ABSTRACT

A device (10) for monitoring strain of an elongate member (12) is deployed underwater. The device (10) comprises a first clamp (14) configured to embrace and couple to the elongate member (12) at a first axial location, a second clamp (16) configured to embrace and couple to the elongate member at a second axial location separated from the first axial location, and a sensor which is responsive to an angle between the first clamp and the second clamp.

18 Claims, 20 Drawing Sheets

(51) Int. Cl.
  *E21B 47/001*  (2012.01)
  *E21B 47/007*  (2012.01)
  *E21B 47/01*   (2012.01)
  *G01L 3/14*    (2006.01)
  *G01M 5/00*    (2006.01)

(52) U.S. Cl.
  CPC ............ *E21B 47/007* (2020.05); *E21B 47/01* (2013.01); *G01L 3/1435* (2013.01); *G01M 5/0025* (2013.01); *G01M 5/0058* (2013.01)

(56) References Cited

FOREIGN PATENT DOCUMENTS

| | | | | | |
|---|---|---|---|---|---|
| GB | 2454220 | A | * | 5/2009 | ............ G01L 1/246 |
| GB | 2457277 | A | * | 8/2009 | ............ G01B 11/18 |
| GB | 2456830 | B | | 3/2012 | |
| GB | 2566001 | A | | 3/2019 | |
| WO | 2006050488 | A1 | | 5/2006 | |
| WO | 2008021881 | A2 | | 2/2008 | |
| WO | 2009156486 | A1 | | 12/2009 | |
| WO | 2010028387 | A2 | | 3/2010 | |
| WO | 2016166505 | A1 | | 10/2016 | |
| WO | 2017065961 | A1 | | 4/2017 | |
| WO | 2020037388 | A1 | | 2/2020 | |

OTHER PUBLICATIONS

PCT International Search Report and Written Opinion, mailed on Jul. 13, 2021 issued in International Application No. PCT/GB2021/050331, filed on Feb. 11, 2021, 19 pages.

* cited by examiner

DEVICE FOR MONITORING STRAIN OF AN ELONGATE UNDERWATER MEMBER

CROSS REFERENCE TO RELATED APPLICATIONS

The present application is a national phase application of and claims priority to International Application No. PCT/GB2021/050331 filed Feb. 11, 2021, which claims priority to Great Britain Patent Application No. GB 2002029.3 filed Feb. 14, 2020. The entire contents of the foregoing applications are hereby incorporated herein by reference.

TECHNICAL FIELD

The present invention relates to monitoring of strain in an elongate member deployed underwater.

BACKGROUND

One application of the present invention relates to monitoring of strain in underwater pipelines and risers used to convey hydrocarbons from a wellhead to another structure. Risers used in oil and gas extraction can be very substantial items but are nonetheless flexible. In service they suffer variable bending loads which cause their curvature to vary with time. Variation of curvature correspond to changes in local strain of the materials making up the riser.

There are important incentives for monitoring the strain suffered by a riser (or by other underwater pipelines or members) in service. Riser failures may have very serious consequences in terms of safety, the environment and cost.

One cause of damage to pipelines is thermal buckling. Consider the example of a pipeline supported on sleepers on the seabed, so that resistance to longitudinal movement of the pipeline can be large. In this case changes of longitudinal dimension of the pipeline produced by changes of its temperature may cause regions of the pipeline to buckle—to suffer excessive curvature which can cause damage.

Operators spend large sums on replacement of infrastructure based on conservative predictions of service lifetime. If in-service strain data were available for a given installation then more accurate and potentially less conservative predictions of fatigue lifetime could safely be used in making decisions about renewal of plant or withdrawal from service, which could have an important impact on costs. In-service strain data may also be useful in verification of design models, in assessment of damage to infrastructure, in quantification of environmental factors, in evaluation of the effects of modifications and repairs, and so on.

The actual motion suffered by pipelines and risers is typically very slow, so that techniques, such as accelerometry, are not well suited to monitoring riser strain. The curvature of a pipeline or riser under strain may be slight. Bend radii of 3000 metres and more may need to be detected. A device for measuring strain therefore needs to be capable of accurate and repeatable measurements. It may also need to survive in the hostile subsea environment for a protracted design lifetime, which can typically be measured in decades. Challenges include hydrostatic pressure at what can be large sea depths.

Measurement of strain may be made by use of strain gauges mounted directly upon the elongate member's outer surface. However the invasive nature of this solution has precluded its widespread adoption.

The prior art includes some devices intended to be mounted in one way or another upon a riser or pipeline to monitor strain. In several instances these serve to mount or couple one or more strain gauges directly upon the outer surface of the riser.

For example U.S. Pat. No. 4,663,975 (Parkinson) discloses an arrangement in which a pair of straps is clamped around an underwater tubular member. Multiple strain gauge assemblies are mounted across the two straps, each aligned parallel to the axis of the tubular member and each comprising a body having at both of its ends a "diver sized" hand knob, so that by tightening the hand knobs the body is urged toward the tubular. Beneath each body a vibrating wire strain gauge is carried between a pair of anchor blocks. Each anchor block is urged into engagement with the surface of the tubular by a respective spring, so that dimensional changes of the riser are transmitted through the anchor blocks to the strain gauge. Multiple performance issues may be identified. It seems that the arrangement is intended to be installed by a diver, who would presumably be required first to pass the straps around the tubular and then to tighten all of the "diver sized hand knobs", of which there are seventeen in the illustrated example. Perhaps this would be a manageable operation in relation to a tubular of modest diameter. It is questionable whether this type of assembly could be applied to a large diameter tubular, such as a typical riser. In that context its installation appears a troublesome process. It is also questionable whether the depicted bands through which the device is mounted would be able to maintain their hold over a protracted design lifetime. The strain gauge arrangement appears to be exposed to marine fouling which might impair its function over the medium to of long term. The mechanism appears to have no protection from hydrostatic pressure, which may affect performance.

GB2566001 (Cowin) provides another example where strain gauges are mounted in direct contact with an underwater tubular, which in this case is said to be a riser as such. In some embodiments, the strain gauges are carried in a flexible jacket which encircles the riser and is in intimate contact with it, the jacket being provided with a collar at one of its ends and a clamp at its other end, to secure the jacket in place. This arrangement too suffers from apparent shortcomings. The practicality of retro-fitting it to a subsea riser is questionable. Accurate stress measurement seemingly relies on maintenance of intimate contact between the jacket and the riser, so that dimensional changes of the riser are reflected in corresponding changes of the jacket, but whether such intimate contact could be reliably maintained over a protracted design lifetime is open to doubt. Electrical connections are clearly required to multiple spatially separated sensors. External cabling for this purpose creates problems in terms of leaks paths into the device.

Arrangements using strain gauges arranged longitudinally of the elongate member, such as those of Parkinson and Cowin, present a difficulty in protecting the strain gauges from damage by hydrostatic pressure. To relieve the gauges of pressure, and water ingress, they need to be contained in a suitably rigid vessel or structure. But in order to perform their function the strain gauges must be capable of undergoing dimensional change which such a rigid structure would inhibit. Some other approach to measurement of riser strain is thus desirable.

WO2017/065961 (Schlumberger) discloses a "smart riser" which in some embodiments has a sensor unit carried between riser couplers in a riser string. There is the suggestion that the unit may, among other things, monitor riser strain, but the question of how riser strain would be transmitted to the sensor unit for sensing is not addressed in any detail.

At the time of writing, WFS Technologies Ltd. have on the market a monitoring device identified by the registered trade mark Seatooth which appears to comprise a pair of ring type clamps with what are thought to be strain gauges extending from one clamp to the other.

There exists a need for a device to monitor strain of an underwater member. It is desirable although not necessarily essential that it should be capable of straightforward and secure mounting to the member. It is desirable although not necessarily essential that such mounting should be capable of maintaining a secure connection to the underwater member over a protracted design lifetime. It is desirable although not necessarily essential that the device should be straightforwardly retro-fittable to a member already deployed underwater. It is desirable although not necessarily essential that the device should be configured to be mounted on an underwater member using a remotely operated vehicle. It is desirable although not necessarily essential that the device should be capable of withstanding large hydrostatic pressure.

SUMMARY

In accordance with the present invention there is a device for monitoring strain of an elongate member deployed underwater, the device comprising a first clamp configured to embrace and couple to the elongate member at a first axial location, a second clamp configured to embrace and couple to the elongate member at a second axial location separated from the first axial location, and a sensor which is responsive to an angle between the first clamp and the second clamp.

BRIEF DESCRIPTION OF THE FIGURES

Specific embodiments of the present invention will now be described, by way of example only, with reference to the accompanying drawings, in which.

DETAILED DESCRIPTION OF EXAMPLE EMBODIMENTS

The first monitoring device 10 depicted in FIGS. 1 to 14 serves to monitor strain suffered by an elongate underwater member 12, which may be any form of tubular member including a pipeline or riser, or may be any form of cable.

In the following description and in the claims, the terms "radial" and "axial" are to be understood with reference to the elongate member 12 on which the monitoring device 10 is mounted. The axial direction extends generally along the length of the elongate member 10. The radial direction extends laterally with respect to the elongate member 10. The term "tangential" refers to a tangent to a circle around the elongate member 12.

In the present embodiment, the monitoring device 10 is configured as a clamp mechanism which is able to be fitted to the elongate member 12 in situ (although it can be fitted prior to deployment of the underwater member). That is, after the elongate member 12 has been deployed underwater, the monitoring device 10 is able to be attached to it. Further, the present embodiment is well suited to being fitted to the elongate member 12 by use of a remotely operated vehicle.

Figure 2:
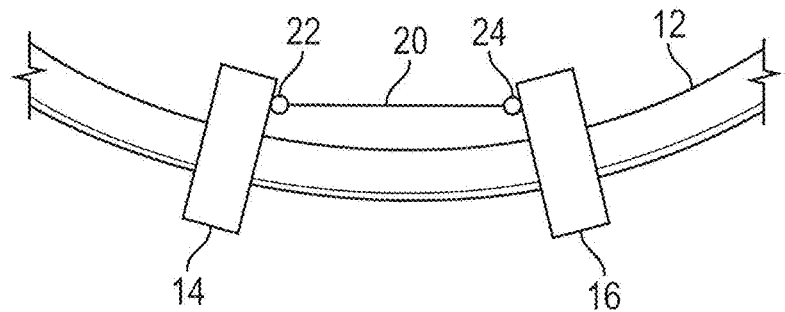
FIG. 2 is a highly stylised depiction of a version of the monitoring device mounted on an elongate member, intended to clarify the general mode of operation of the device.

The monitoring device 10 has first and second clamps 14, 16 each of which embrace the elongate member 12 such as to be rigidly coupled to it and to move along with it. FIG. 2 provides a highly stylised representation of the clamp arrangement from which the manner of operation of the monitoring device 10 can be understood. The first and second clamps 14, 16 are axially separated and are each intimately coupled to a respective region of the elongate member 12. Changes of curvature of the elongate member 12 cause changes in the angle of the first clamp 14 with respect to the second clamp 16, so by sensing that angle the strain suffered by the elongate member 12 can be determined.

Measurement of the relevant angle is made using a sensor arrangement comprising a sensor actuator member 20 which is coupled to both the first clamp 14 and the second clamp 16. One end of the sensor actuator member 20 is coupled to the second clamp 16 through a pivotal coupling 24. The other end of the sensor actuator member 20 is coupled through an angle sensor 22 to the first clamp 14. The angle sensor 22 provides an output representative of an angle between the sensor actuator member 20 and the first clamp 14. Relative angular movement of the two clamps 14, 16 due to changes of strain in the elongate member 12 is thus measurable through the angle sensor 22.

Figure 3:
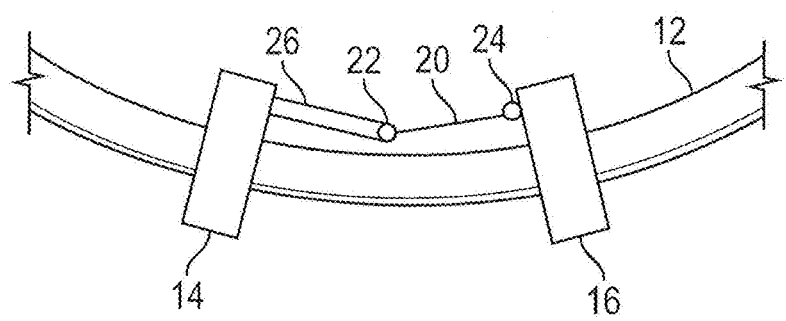
FIG. 3 is a similarly stylised depiction of a more refined version of the monitoring device mounted on the elongate member.
Figure 4:
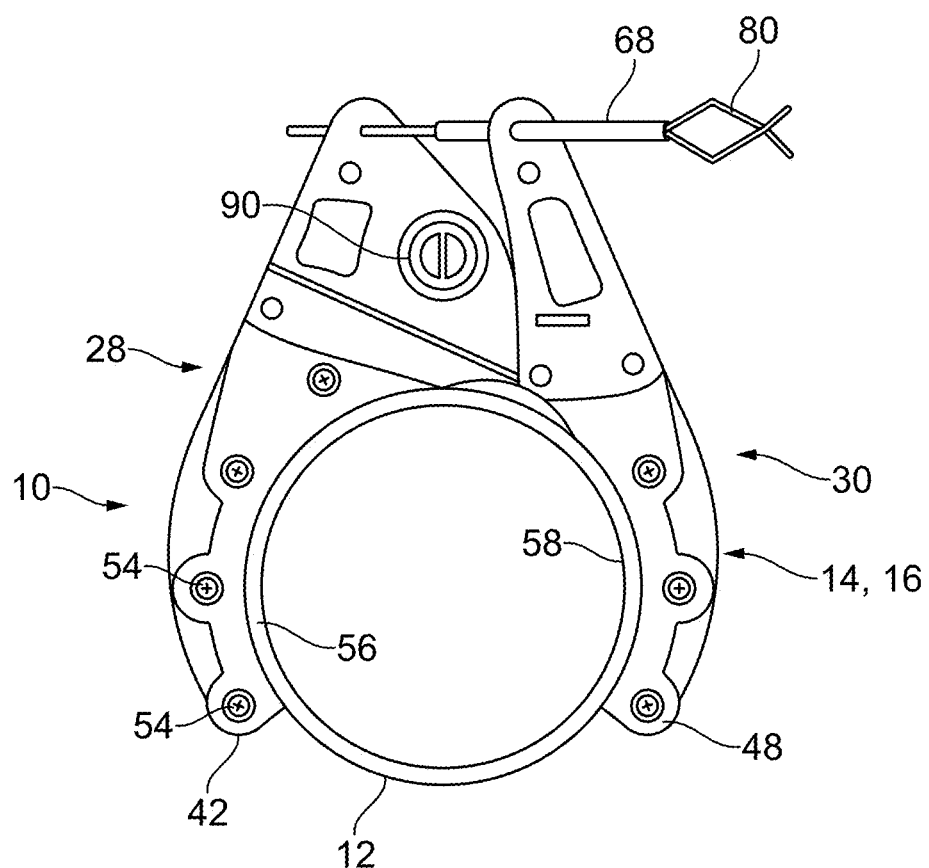
FIG. 4 depicts the monitoring device seated on the elongate member, viewed along an axial direction.

FIG. 3 represents a refinement of the FIG. 2 arrangement. Here, the angle sensor 22 is carried on a rigid cantilevered limb 26 extending from the first clamp 14 toward the second clamp 16, so that the angle sensor 22 is disposed mid-way between the clamps 14, 16. The result is that a given angular displacement of the first clamp 14 relative to the second clamp 16 produces a larger angular displacement of the parts of the angle sensor 22. Hence the provision of the cantilevered limb 26 improves the sensitivity and accuracy of the sensor arrangement. The same geometric effect could in other embodiments be achieved by mounting the pivotal coupling 24 on an arm cantilevered from the second clamp 16.

Note that the angle sensor 22 provides two outputs corresponding to angular position about two non-parallel (and typically perpendicular) axes, so that curvature of the elongate member 12 can be determined in two non-parallel (and typically perpendicular) planes.

Figure 1:
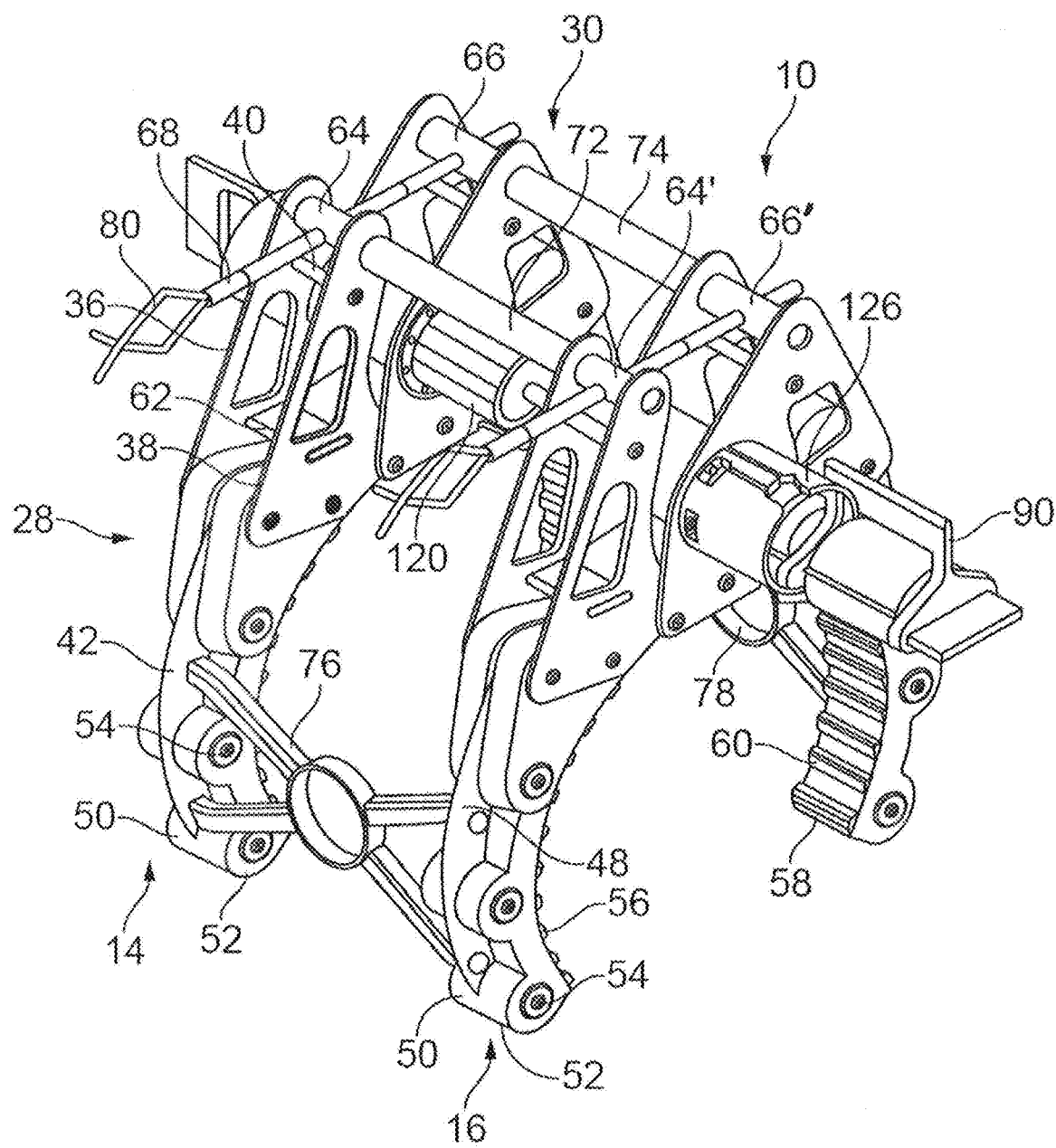
FIG. 1 depicts a monitoring device embodying the present invention, viewed along a direction inclined to the axial direction.

Looking in more detail at the physical construction of the monitoring device 10, it can be seen in FIG. 1 that the first and second clamps 14, 16 are in this example of somewhat similar construction. The construction of the first clamp 14 will be described. The construction of the second clamp 16 largely corresponds. First clamp 14 comprises a rigid frame which is seen on its own in FIG. 6 and which in the present embodiment comprises metal and more specifically titanium. A first jaw assembly 28 is pivotally coupled to a second jaw assembly 30 by means of a through-going pivot rod 32, so that the jaws can be opened to receive the elongate member 12 and then closed about it. The first jaw assembly 28 comprises (a) an outer lever portion comprising a parallel pair of shaped plates 36, 38 coupled to one another through crossbars 40 and (b) an inner gripping portion shaped to embrace the elongate member 12, having a part-circular inner edge, and formed by a single plate 42. The second jaw assembly is somewhat similar in construction to the first, comprising an outer lever portion formed by a parallel pair of shaped plates 44, 46 transitioning to an inner gripping portion formed by a single plate 48. On either side of each of the single plates 42, 48 is a respective shoulder portion 50, 52 (see FIG. 1), these being secured to the single plates by through-rods 54 and shaped to form part-circular clamping faces 56, 58 carrying in the present embodiment ribs 60 for engaging the elongate member 12.

A leaf spring 62 biases the clamp 14 toward a closed configuration (i.e. it biases the clamping faces 56, 58 toward one another). The first jaw assembly 28 carries on its lever portion 36, 38 a first clamping bar 64. The second jaw assembly 30 carries on its lever portion 44, 46 a second clamping bar 66. Drawing the clamping bars 64, 66 together opens the first clamp 14 against the force of the leaf spring 62, enabling the clamp to be placed on the elongate member 12, and releasing the clamping bars enables the clamp 14 to close around the elongate member 12 under the influence of the leaf spring 62. A clamping screw 68 runs through the first and the second clamping bars 64, 66, being externally threaded and screwed into the first clamping bar 64 but forming a sliding fit in the second clamping bar 66. While the clamping screw 68 is loose, it permits the clamp to open and close. But turning the clamping screw 68 causes it to urge the clamping bars 64, 66 apart to securely clamp the first clamp 14 to the elongate member 12.

Looking again at FIG. 1, the clamping bars 64, 66 of the first clamp 14 are seen to be coupled through grab bars 72, 74 to the clamping bars 64', 66' of the second clamp. Note however that the grab bars 72, 74 do not prevent angular movement of one clamp 14 relative to the other clamp 16 (as depicted in FIGS. 2 and 3). This may, for example, be because they are sufficiently compliant to bend when the clamps move. In the present embodiment, the grab bars are formed as compliant sleeves that receive the clamping bars 64, 66.

The first and second clamps 14, 16 are connected to one another in the present embodiment through flex links 76, 78, which in the present embodiment are roughly "X" shaped polymer components coupled to the single plates 42, 48. In this way the first and second clamps 14, 16 are united to form a single assembly which is straightforward to manipulate prior to and during installation on the elongate member 12. The flex links 76, 78 also serve to define a spacing between the clamps prior to installation. But once the monitoring device 10 has been deployed, the flex links are sufficiently compliant to permit the clamps 14, 16 to move relative to one another, in accordance with flexure of the elongate member 12.

The monitoring device 10 is able to be deployed straightforwardly subsea using an ROV (remotely operated vehicle). The device is first grasped by a manipulator of the ROV through the grab bars 72, 74, and is opened using the grab bars and placed around the elongate member 12. Releasing the grab bars allows the clamps 14, 16 to close around the elongate member 12 under the influence of the leaf springs 62, so that the monitoring device 10 is able to maintain itself in position on the elongate member 12. Then, to provide a required clamping force, the ROV engages with fishtail torqueing features 80 of the clamping screws 68 and so turns the screws to tighten the clamps.

In the present embodiment, the angle sensor 22 and associated electronics are contained in a sensor unit 90 which is depicted particularly in FIGS. 7A-7C, 13 and 14. The sensor unit 90 can be self-contained and self-powered. It can be sealed against ingress of water. It may take the form of a pressure vessel to protect the sensors and associated components from the effects of hydrostatic pressure. The sensor unit 90 may be mounted in such a manner as to enable it to be straightforwardly removed and replaced using an ROV. Thus, for example, it may be replaced when its batteries approach or reach the end of their operational lifetime, and it may be removed to enable logged data to be downloaded.

Figure 7A:
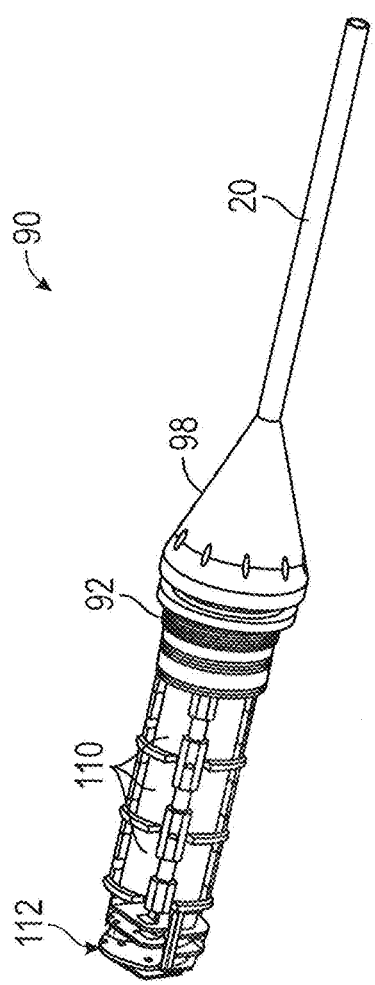
FIG. 7A depicts a sensor unit of the monitoring device, an external housing being omitted to reveal interior details.
Figure 7B:
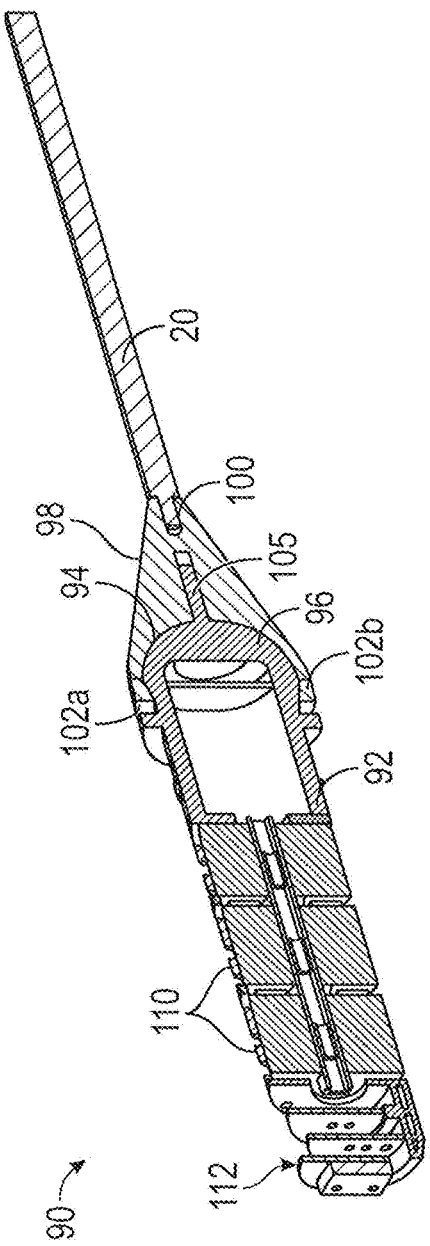
FIG. 7B is a section through the sensor unit, the external housing again being omitted.
Figure 7C:
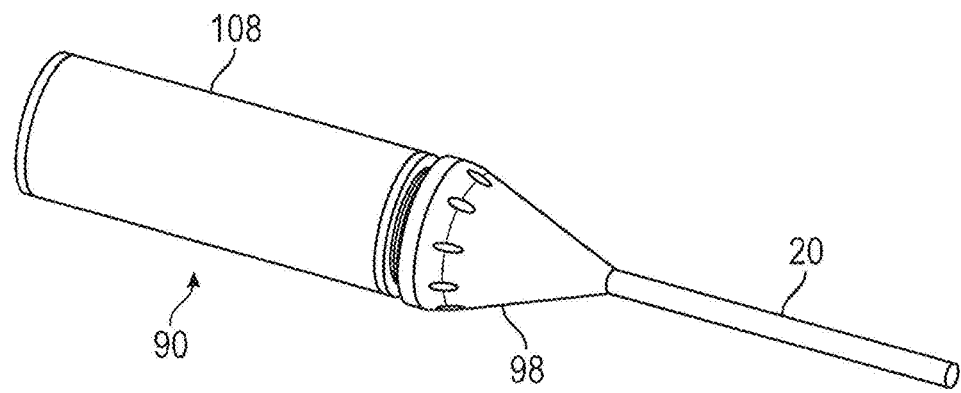
FIG. 7C depicts the sensor unit with its external housing in place.
Figure 7D:
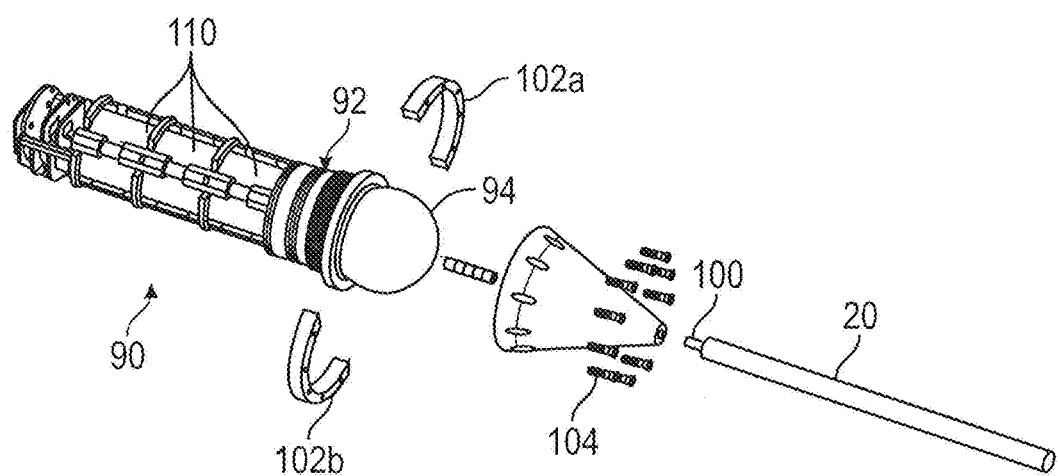
FIG. 7D is an exploded depiction of the sensor unit.

A sensor body 92 of the sensor unit 90 is coupled to the sensor actuator member 20 in a manner which permits one to turn one somewhat relative to the other and it is the angle between the sensor body 92 and the sensor actuator member 20 that is measured to determine strain in the elongate member 12. In the present embodiment, the coupling of the two parts is made through a ball and socket arrangement whose ball 94 is formed on an end of the sensor body 92 and whose socket 96 is formed in a frusto-conical cap portion 98 of the sensor actuator member 20. In the present embodiment, for convenience of manufacture, the cap portion 98 is a separate component from the remainder of the sensor actuator member 20, these parts being screwed together at 100. As illustrated in FIG. 7D, a two-part collar 102*a*, 102*b* is secured to the cap portion 98 by threaded fasteners 104 and completes the socket 96, rendering the ball 94 captive.

In the present embodiment, a magnetic sensor arrangement is used to measure the angle between the sensor body 92 and the sensor actuator member 20. One advantage of this is that the sensor arrangement itself does not rely on a physical connection between the sensor and the sensor actuator member 20, so that the sensor itself and its associated electronics can be contained within the sealed vessel formed by the sensor unit 90, and are thus not exposed to hydrostatic pressure nor to contamination or damage by any water-borne agents. A magnetic field is created by a magnet coupled to the sensor actuator member 20. In the present embodiment, this comprises a stack of rare earth magnets 105 disposed in an axial bore in the cap portion 98 (see FIG. 7B). The magnetic field is sensed by a tri-axial magnetometer within the sensor unit 90. The orientation of the field relative to the magnetometer varies with the angle between the sensor unit 90 and the sensor actuator member 20, and this produces changes in the magnetometer's output. By suitable processing of the magnetometer output, the angle can thus be obtained.

The sensor unit 90 comprises a hollow cylindrical housing 108 (see FIG. 7C) containing a battery pack 110 and circuit boards 112.

Figure 5A:
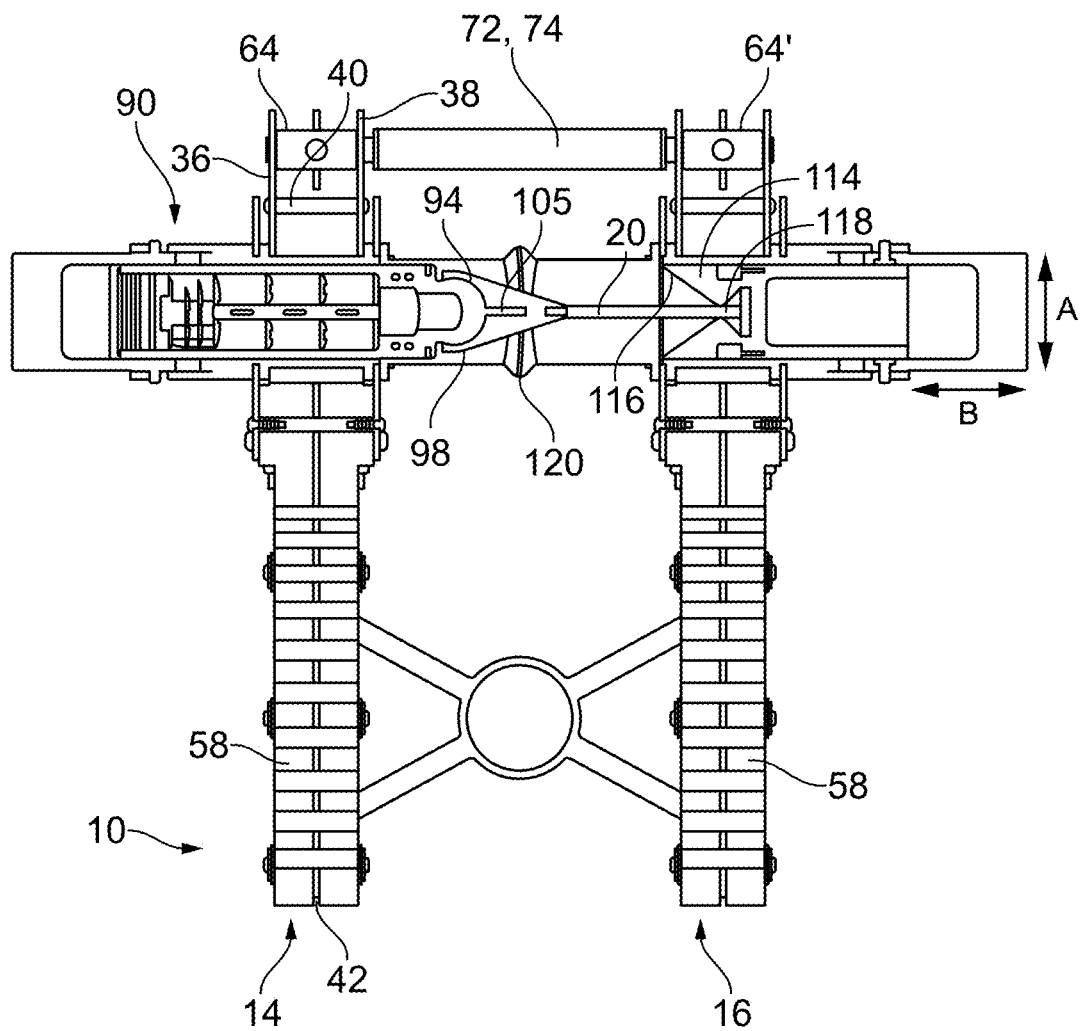
FIG. 5A depicts the monitoring device in section through a plane parallel to the axis of the elongate member and FIG. 5B is a section through the monitoring device in the same plane, but viewed along a direction inclined to the axis.
Figure 5B:
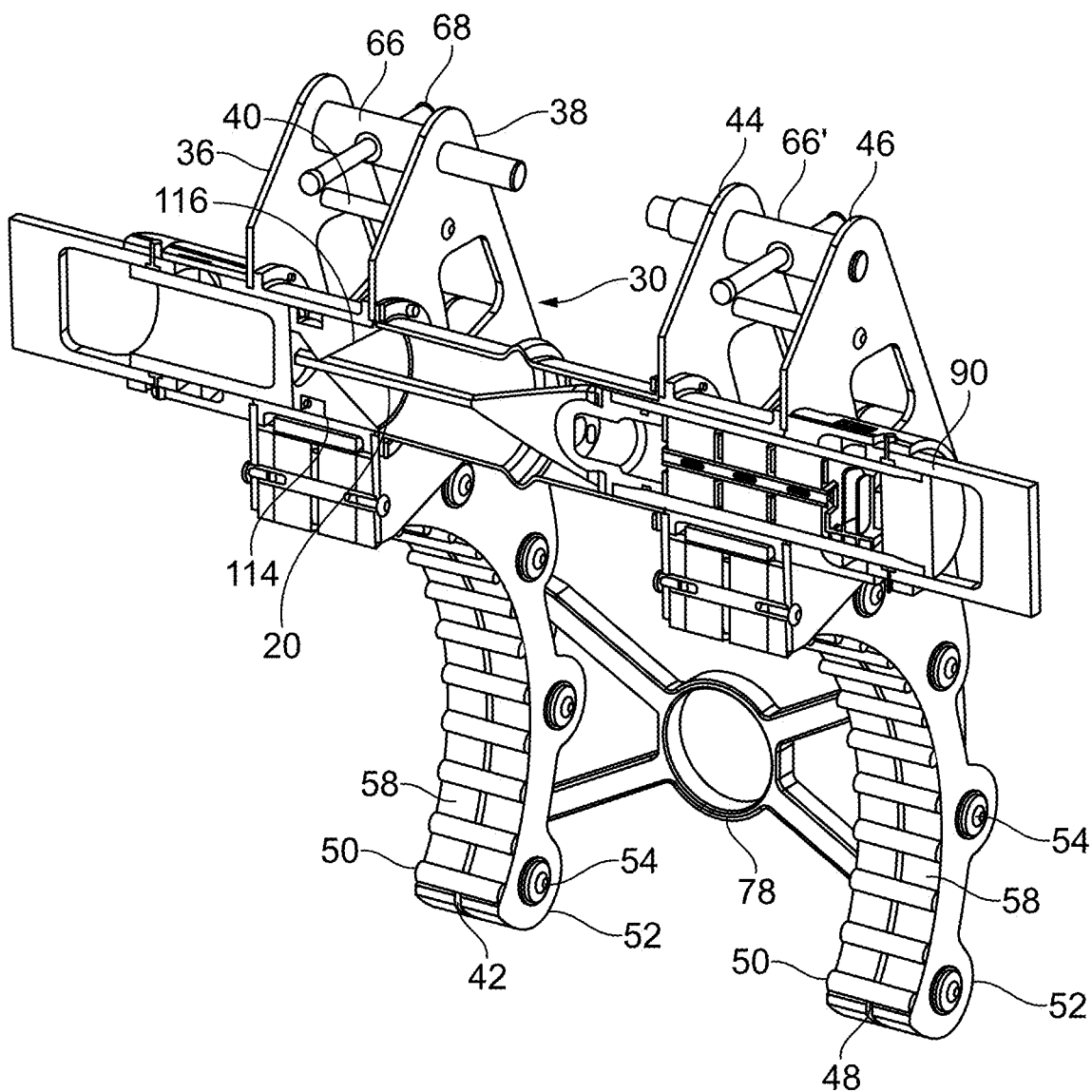
Figure 6:
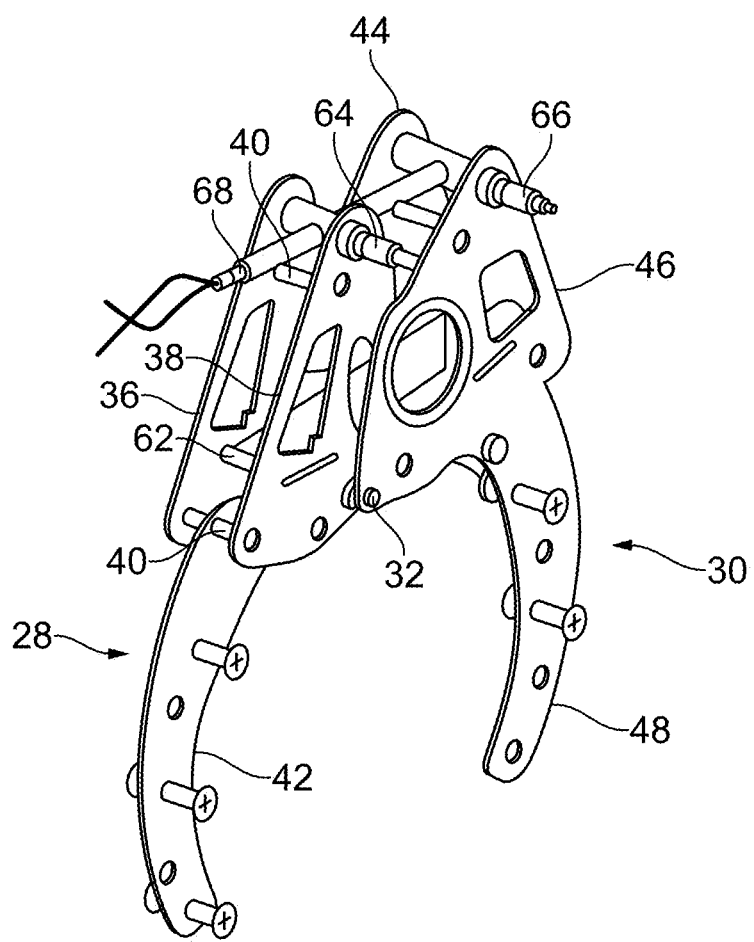
FIG. 6 depicts a metal frame of a first clamp of the monitoring device.

Referring in particular to FIGS. 5A and 5B, the sensor unit 90 is seen to be mounted to the first clamp 14, and to project from it toward the second clamp 16, thus serving the same function as the cantilevered limb 26 of FIG. 3, bringing the pivotal coupling (item 24 in FIG. 3, or equivalently the ball and socket arrangement 94/96 of the FIG. 7 embodiment) closer to the first clamp 16, and so increasing the angular movement suffered by the sensor actuator member 20 in response to a given angular movement of the first clamp 14 relative to the second clamp 16. The second clamp 16 carries a coupler 114 providing a conical internal cavity 116 into which the sensor actuator member 20 protrudes, being closely embraced by a waist portion 118 of the said internal cavity. In this way the sensor actuator member's free end is coupled to the first clamp 14 such as to move along with it in response to strain suffered by the elongate member 12. In this vicinity the waist portion locates the sensor actuator member 20 against movement relative to the second clamp 16 in the radial direction (arrow A in FIG. 5A) and in the tangential direction (that is, along a tangent to the axis of the elongate member 12, i.e. perpendicular to the plane of the paper in FIG. 5A). However, the coupling provided by means of the coupler 114 accommodates both (a) angular movement of the clamp 16 relative to the sensor actuator member 20 and (b) axial movement of the clamp 16 relative to the sensor actuator member 20 (arrow B in FIG. 5A, along the axis of the elongate member 12) which causes the sensor actuator member 20 to slide somewhat relative to the coupler 114.

A compliant sleeve 120 is provided around the sensor actuator member 20, bridging the gap between the first and second clamps 14, 16 and defining a largely enclosed volume 122 (see FIG. 9) around certain working parts of the sensor arrangement. In the present embodiment, this enclosed space is not sealed from the surrounding environment. When the monitoring device 10 is submerged, it fills with water at the ambient pressure. But it is largely stagnant-water flow into/out of the volume 122 takes place only at a low rate, if at all. This makes it possible to maintain in the volume 122 a high concentration of an anti-fouling agent to resist growth of aquatic organisms which might otherwise impair the function of the sensor arrangement over time. A sacrificial coating of a suitable biocide may be provided on exposed surfaces in this region. Such coatings have a finite active lifetime, but their deployment in an essentially stagnant volume of water can greatly increase this lifetime. The compliant sleeve 120 is able to deform in accordance with movement of one clamp 14 relative to the other clamp 16 and so does not impede the required angular motion of the clamps.

Figure 8:
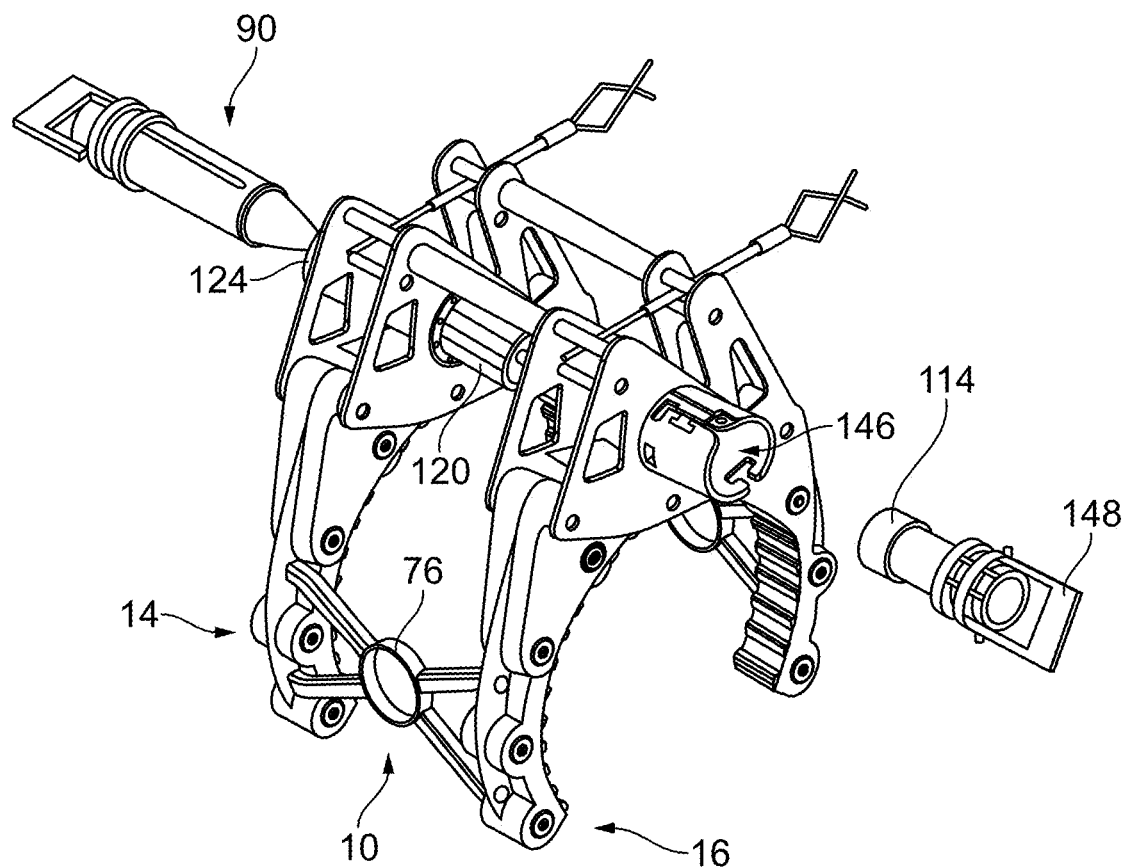
FIG. 8 depicts the monitoring device with certain separable modules removed.
Figure 9:
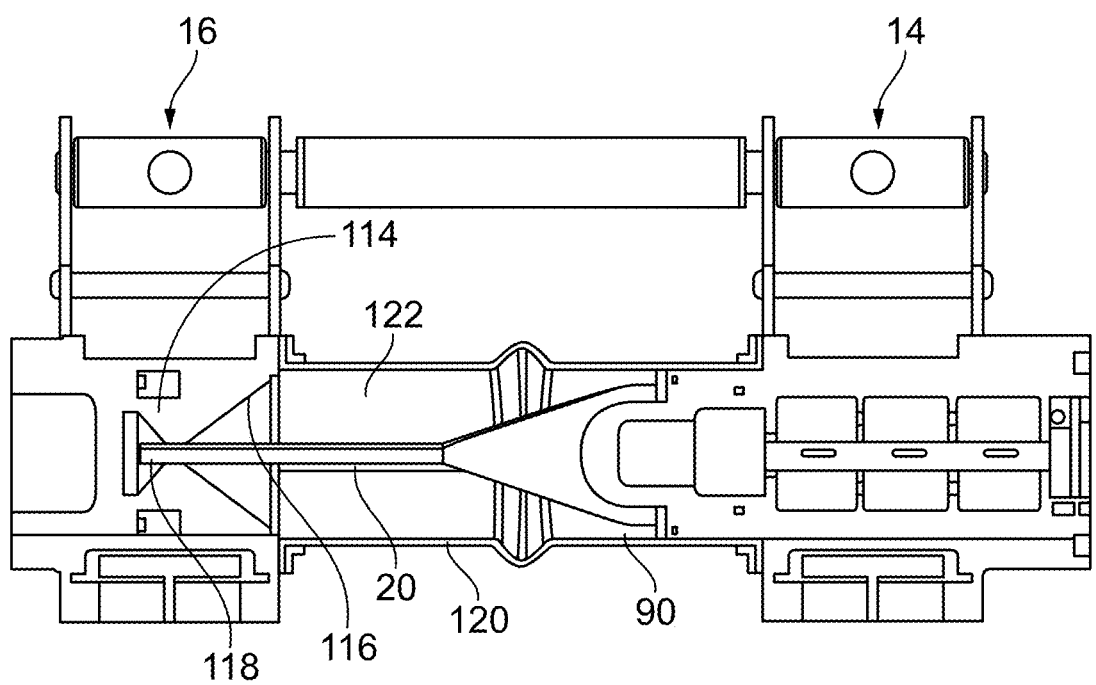
FIG. 9 is a section through part of the monitoring device in a plane parallel to the axis of the elongate member.

The sensor unit 90 is able to be removed from the remainder of the monitoring device 10 as seen in FIG. 8. This is advantageous for several reasons. The batteries 110 have a finite lifetime. Periodically they require renewal. This can be easily accomplished by removing the sensor unit 90 and replacing it with another unit. The original unit may then have its batteries replaced and be returned to service. The sensor unit 90 preferably logs sensor data onboard. One convenient way to retrieve the data is to retrieve the entire sensor unit 90. Also, any failed sensor unit 90 may be straightforwardly replaced without the need to replace the entire monitoring unit 10.

Figure 13:
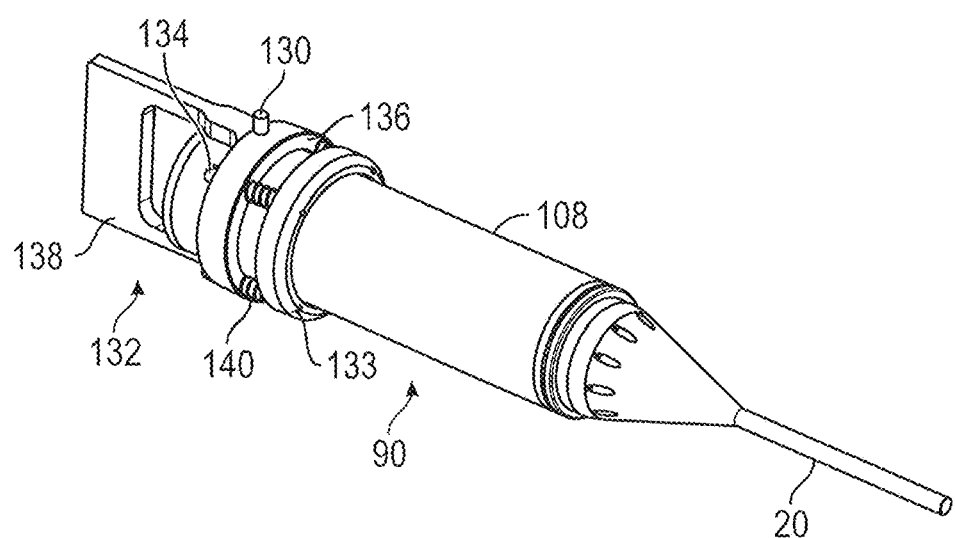
FIG. 13 depicts a sensor unit of the monitoring device.
Figure 14:
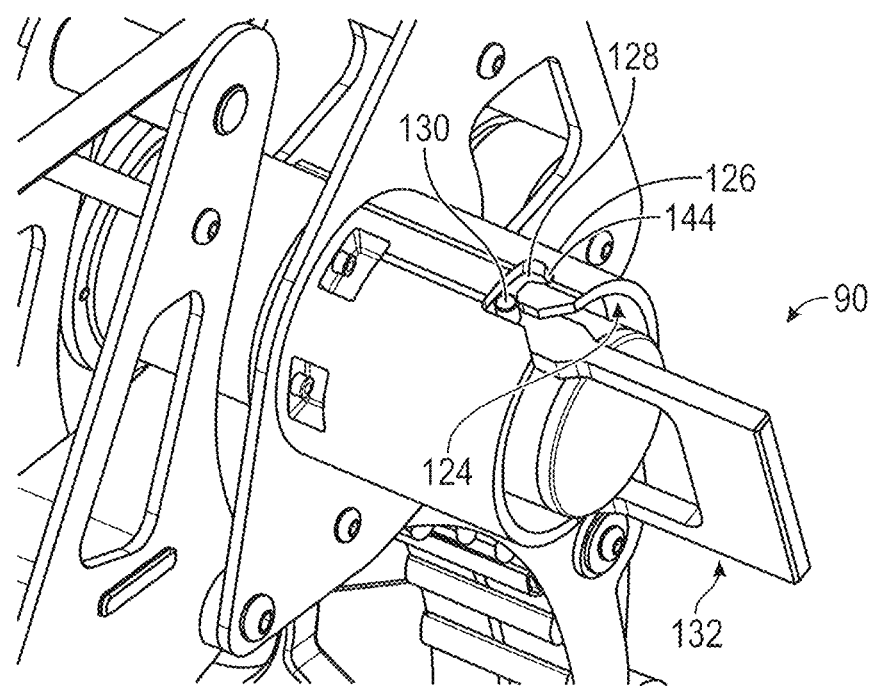
FIG. 14 depicts a part of the monitoring device including features forming a part turn lock for the sensor unit.

Referring in particular to FIGS. 13 and 14, in the present embodiment the sensor unit 90 is inserted into a complementary socket 124 in the second clamp 16, and is retained in it by a part turn lock mechanism, which could also be referred to as a bayonet mechanism. The socket comprises a wall 126 with a cutaway 128 to receive a follower 130 of a handle assembly 132 carried by the sensor unit 90. The handle mechanism comprises a mounting ring 133 secured to the sensor body 92 and carrying multiple upstanding bolts 134 which pass through a sprung ring 136 which carries a handle portion 138. Helical springs 140 bias the sprung ring 136 away from the mounting ring 133. On an outer face the sprung ring 136 carries the follower 130. Upon insertion of the sensor unit 90 into the socket 124, the follower 130 is introduced to the cutaway 128. As the sensor unit 90 is advanced, the springs 140 are compressed. The sensor unit 90 can then be turned through a small angle until the follower aligns with a short, blind return 144 of the cutaway, into which the follower is urged by the springs to lock the sensor unit in position. Note—with reference to FIG. 8—that simply advancing the sensor unit 90 into the socket 124 causes the sensor actuator member 20 to be received by the coupler 114.

The whole process of inserting and removing the sensor unit 90 can thus be carried out very straightforwardly using an effector of an ROV using the handle portion 138.

The illustrated part turn lock mechanism is only one example of a suitable means for retaining the sensor unit 90. Another possibility is to provide some form of snap fit mechanism. Various alternatives will present themselves to the skilled person.

The coupling 114 is also able to be easily removed for replacement, inspection or refurbishment. Referring to FIG. 8, it is received in a socket 146 of the second clamp 16, and is provided with a handle 148 and a part turn lock mechanism of the same form as the one already described.

The use of a magnetometer to determine angle between the first and second clamps is especially advantageous. It permits the required angle sensor (the magnetometer itself) to be housed inside the sealed housing 108 which can be formed as a pressure vessel able to withstand the potentially large hydrostatic pressure suffered by the device. No mechanical connection from the interior to the exterior of the housing 108 is needed to actuate the sensor. Provision of such a connection might provide a potential route for ingress of water, or might otherwise contribute unwanted stiffness which would inhibit the sensor's action. The magnetometer can be a compact and reliable MEMs (micro-mechanical) type of device—suitable magnetometers are commercially available. Such a magnetometer can have a low power requirement, helping to maximise battery lifetime which, since visits to the device may be infrequent and expensive, is an important design factor.

The magnetic sensor arrangement used in the above described embodiment may be replaced, in other embodiments, with a different type of sensor arrangement for measuring the angle between the two clamps 14, 16.

Figure 10:
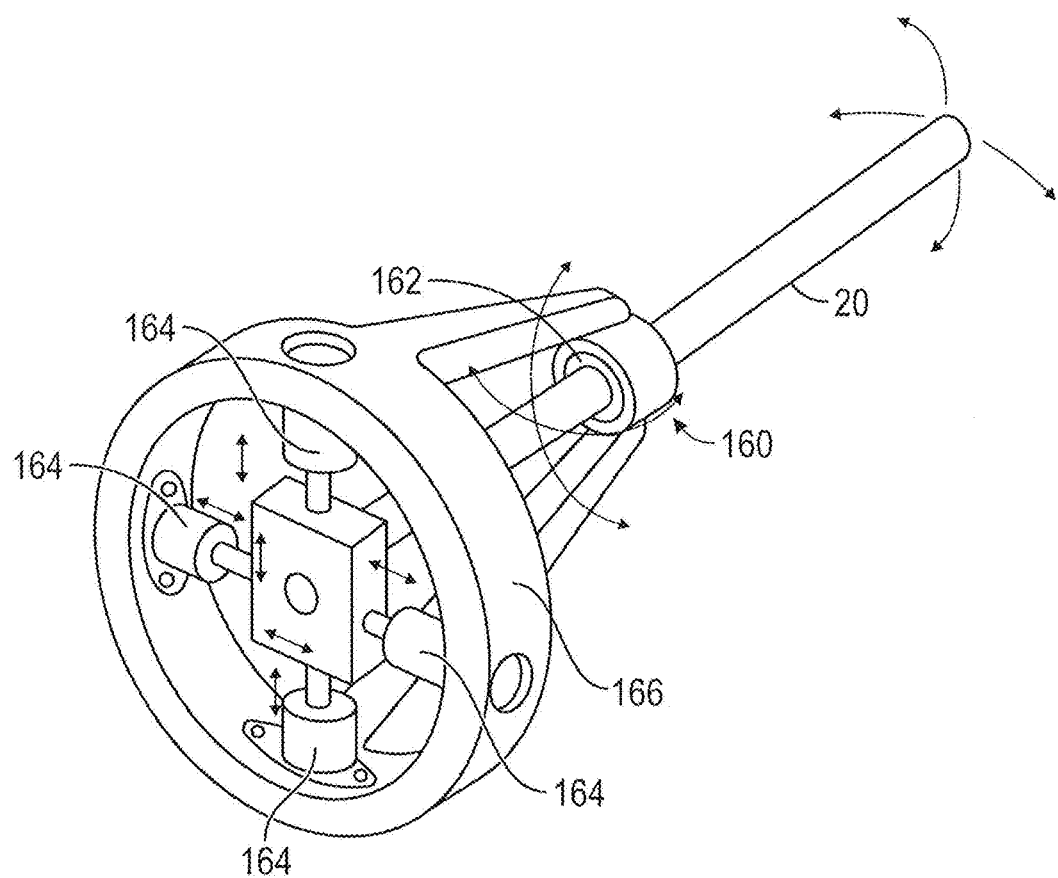
FIG. 10 depicts an alternative sensor arrangement for the monitoring device.

FIG. 10 depicts an alternative sensor arrangement which uses linear sensors to detect the position of the sensor actuator member 20. The sensor actuator member 20 passes through a locating arrangement 160 which locates it laterally whilst permitting angular movement. This uses a spherical joint in the present embodiment, the sensor actuator member 20 passing through an opening in ball 162 of the joint. This configuration is often referred to as a rose joint (UK) or a heim joint (North America). Inboard of the locating arrangement the sensor actuator member 20 couples to a set of linear position sensors 164. In the illustrated example, a cage structure 166 carries both the position sensors 164 and the locating arrangement 160. The position sensors 164 are directed laterally with respect to the sensor actuator member 20, and are operatively coupled to it, so that angular movement of the sensor actuator member 20 causes a linear displacement along the direction of action of the sensor. Hence the sensor output can be used to determine the angular position of the sensor actuator member 20, and this data can be used to calculate strain suffered by the elongate member 12. In the illustrated example, there are two parallel pairs of position sensors 164 but this provides some redundancy—a functioning device could be constructed using just two position sensors 164 oriented along different (preferably perpendicular) directions.

Figure 11:
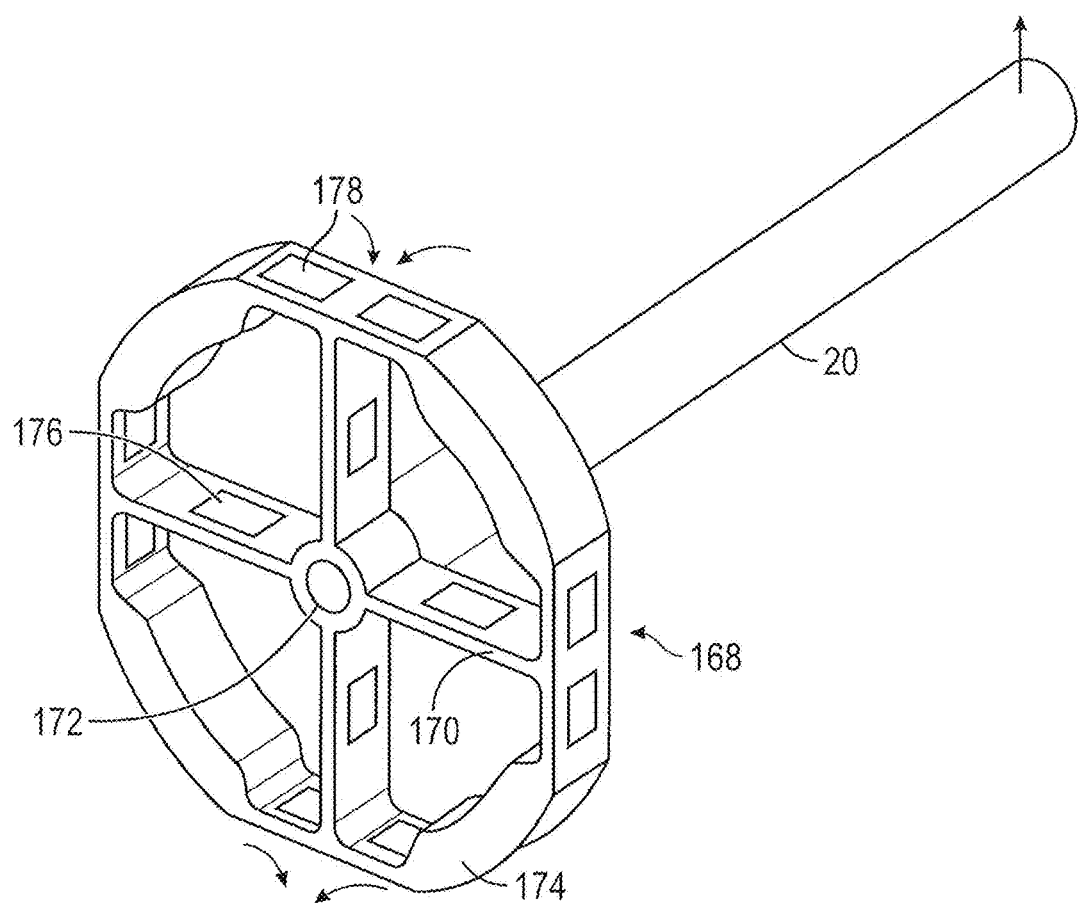
FIG. 11 depicts another alternative sensor arrangement for the monitoring device.

FIG. 11 represents a further alternative sensor arrangement in which the sensor actuator member 20 is cantilevered from a dual axis load cell 168. In this example, the load cell has a cruciform support structure formed by four arms 170 radiating from a boss 172 from which the sensor actuator member 20 is cantilevered. The arms 170 meet an outer frame 174. Strain gauges 176, 178 are mounted to the load cell 168 to detect deformation created by movement of the sensor actuator member 20. In this embodiment, there are strain gauges 176 on the arms 170 and strain gauges 178 on the outer frame 174. Following calibration, the outputs of the strain gauges 176, 178 can be used to determine the orientation of the sensor actuator member 20, and from that data the strain suffered by the elongate member 12 can be calculated.

Figure 16:
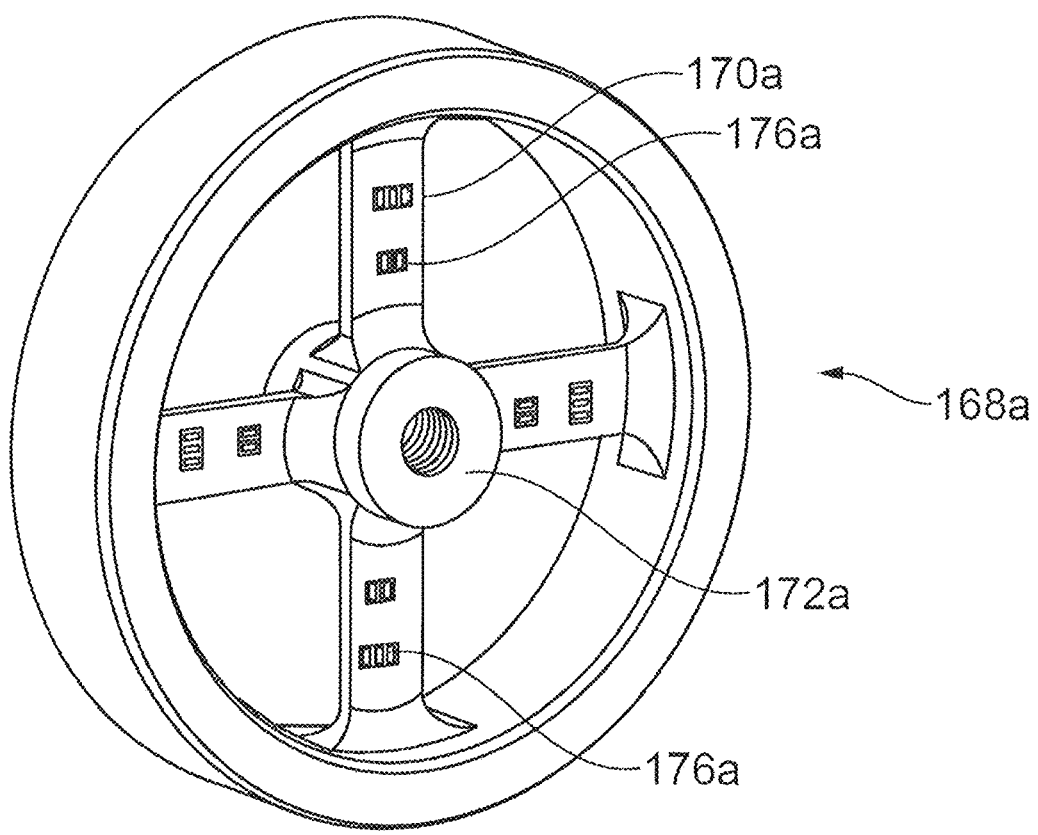
FIGS. 16 and 17 depict load cell arrangements used in embodiments of the invention.
Figure 17:
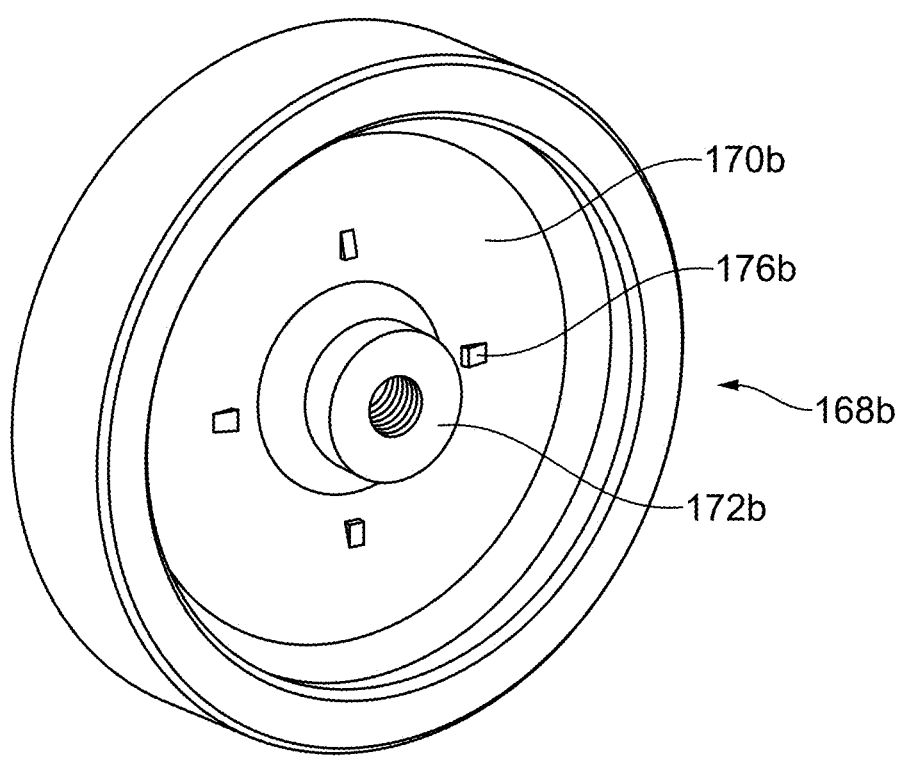

FIGS. 16 and 17 represent alternative forms of the load cell. The load cell 168a depicted in FIG. 16 has a rigid circular periphery with a cruciform arrangement of arms 170a radiating from a boss 172a and carrying strain gauges 176a. The load cell 168b depicted in FIG. 17 has a rigid circular periphery supporting a disc 170b which carries the boss 172b, and strain gauges 176b are provided on the disc to sense its deformation under bending load.

Figure 12:
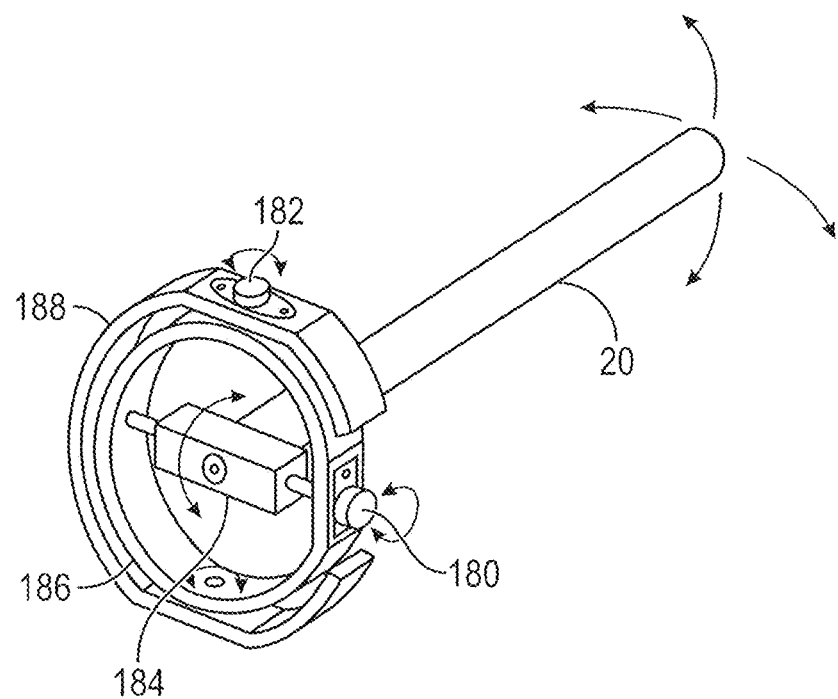
FIG. 12 depicts still another alternative sensor arrangement for the monitoring device.

FIG. 12 represents another alternative sensor arrangement using first and second rotary position sensors 180, 182 in a form of a gimbal mechanism to determine the angular position of the sensor actuator member 20. Here, the sensor actuator member 20 is cantilevered from a central mount 184 which is rotatable about a first axis with respect to a gimbal member 186. Rotary position of the sensor actuator member with respect to the first axis is determined by first rotary position sensor 180. The gimbal member 186 is rotatable about a second axis (which is perpendicular to the first axis in the present embodiment) with respect to a frame 188 and rotary position of the sensor actuator member 20 with respect to the second axis is determined by second rotary position sensor 182. From the outputs of the rotary position sensors 180, 182, the angular position of the sensor actuator member 20 can be found, and from that data the strain suffered by the elongate member 12 can be calculated.

Figure 18:
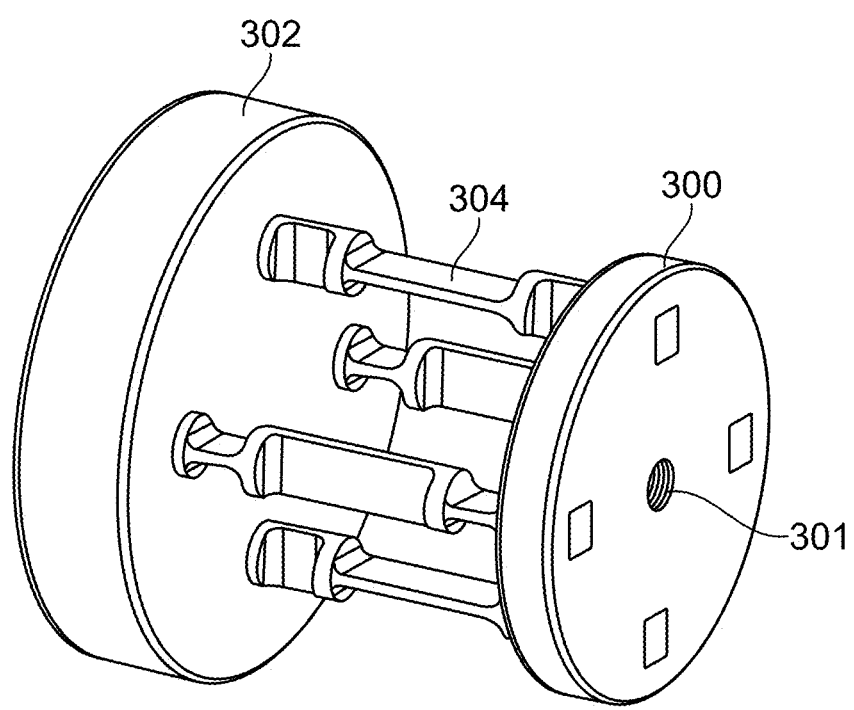
FIG. 18 depicts another alternative sensor arrangement used in embodiments of the invention.

FIG. 18 represents still another sensor arrangement. Here, a movable plate 300 is threaded at 301 to receive the sensor actuator member 20 and is able to turn somewhat along with it. The movable plate 300 is linked to a base plate 302 through a set of strain gauges 304 extending across a gap between the plates, so that angular movement of the movable plate 300 changes the strains suffered by the gauges 304, and so from the gauge outputs the angle of the movable plate 300 can be obtained.

The monitoring device 10, and in particular the sensor unit 90, may incorporate any of a range of additional sensors to monitor further operational parameters of the elongate member 12 and/or its environment. Without limitation, these may include any of the following:

an accelerometer to determine acceleration of the elongate member 12 and in some embodiments its position and/or its orientation;
a gyroscopic sensor;
one or more temperature sensors responsive to environmental temperature (water temperature) and/or surface temperature of the elongate member 12;
one or more pressure sensors responsive to external hydrostatic pressure, from which depth can be determined.

The monitoring device 10 generates sensor data which is (a) logged and (b) communicated to a separate processing device.

Typically data from the sensors will be collected and logged periodically. The logging period may be fixed or variable, and will typically be determined taking account of factors including frequency of any expected cyclical movement and battery lifetime. In some embodiments, battery lifetime may be extended by harvesting of energy from the environment, e.g. by use of photovoltaic cells (where the environment provides sufficient light), thermoelectric generators, or triboelectric or piezoelectric generators.

The sensor unit 90 comprises on-board memory capacity for logging sensor data. It may also comprise an on-board processing device to process sensor data, reducing the quantity of data that needs to be exported from the sensor unit 90.

A communications interface is provided for exporting sensor data to a separate processing system. The present invention is not limited to use of any specific mode of communication. Data may for example be exported through a radio link, through an optical link, through an acoustic link or through a physical connection which could comprise an electrical wire or optical fibre.

In some embodiments, data is to be retrieved from the sensor unit 90 through a short range link. This may for example be carried out using an ROV which visits the site and collects sensor data.

Figure 15:
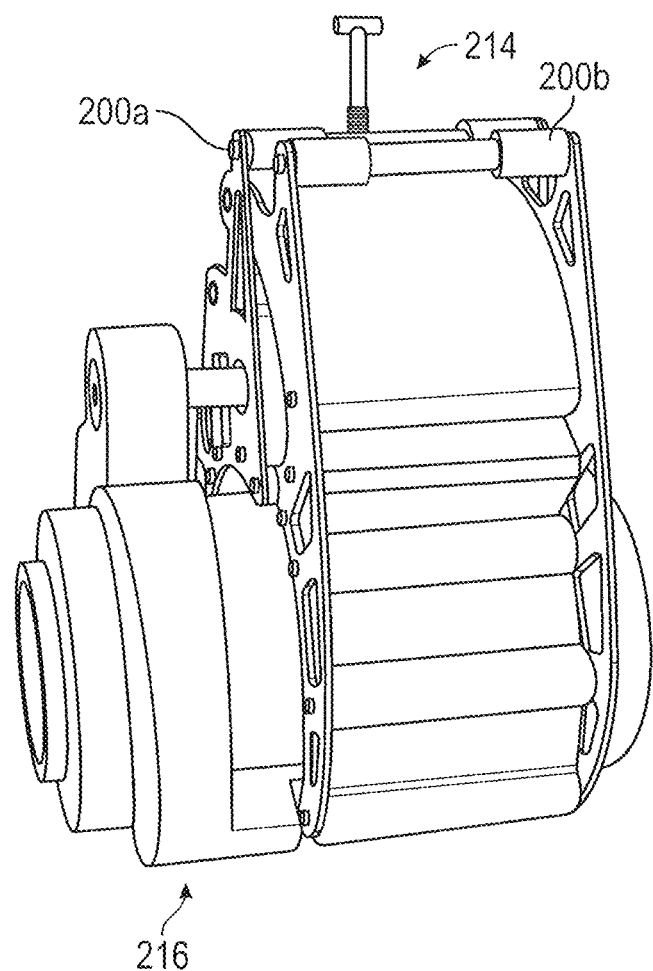
FIG. 15 depicts an alternative embodiment of the monitoring device.

It should be understood that the principle of operation represented in FIGS. 2 and 3 may be put into practice using a whole range of different physical embodiments. For example the clamps may take any of a range of different forms. They could for example take the form of band clamps. FIG. 15 provides just one example of an alternative mode of implementation of the present invention. Here, the first clamp 214 comprises a stiff hinged framework 200a, 200b. The second clamp 216 comprises a pair of elastomer jaws. The sensor actuator member 20 is not seen in this drawing but is coupled between the clamps 214, 216 as before.

Figure 19:
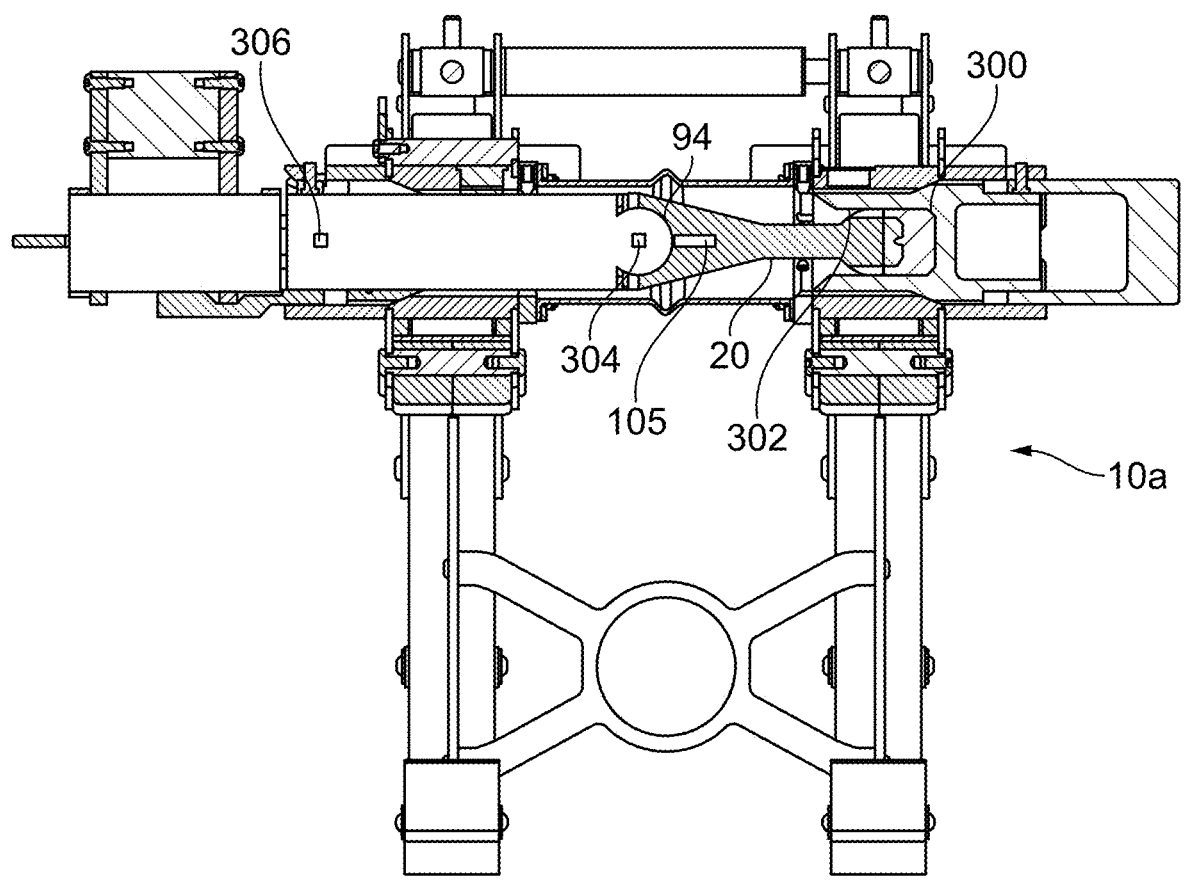
FIG. 19 depicts a further embodiment of the monitoring device in a section through a plane parallel to the axis of the elongate member. For the sake of clarity, certain internal details of the monitoring device are omitted from this drawing.

The further embodiment 10a of the monitoring device, depicted in FIG. 19, is in most respects similar to the first embodiment and like parts are given the same reference numerals. The monitoring device 10a differs from the above-described monitoring device 10 in that the actuator member 20 terminates in an enlarged piston head 300 received in a cylinder 302, so that the piston head 300 is able to move somewhat during flexure of the elongate member 12.

FIG. 19 also serves to represent the location of sensing magnetometer 304 which, by sensing the magnetic field of the magnets 105, provides the sensor's output. The sensing magnetometer 304 is positioned in this embodiment at the centre of the ball 94, so that its separation from the magnets 105 does not vary with angle.

The present embodiment further comprises a compensation magnetometer 306 positioned remotely from the magnets 105. The monitoring device 10a may be subject, in practice, to externally generated magnetic fields, e.g. due to magnetisation of metal components of the elongate member 12. These externally generated fields may affect the signal from the sensing magnetometer 304, having a deleterious effect on its accuracy. The compensation magnetometer 306 senses such externally generated fields, and makes it possible to compensate for them. Most straightforwardly, compensation may involve deducting the output of the compensation magnetometer 306 from the output of the sensing magnetometer 304.

The invention claimed is:

1. A device configured for monitoring strain of an elongate member deployed underwater, the device comprising:
    a first clamp configured to embrace and couple to the elongate member at a first axial location,
    a second clamp configured to embrace and couple to the elongate member at a second axial location separated from the first axial location,
    a sensor actuator member coupled to the first clamp and the second clamp, wherein the sensor actuator member is coupled to the first clamp through a first coupling that comprises a ball and socket and that permits the sensor actuator member to move angularly with respect to the first clamp, and
    a sensor which is responsive to an angle between the first clamp and the second clamp.

2. The device as claimed in claim 1 in which the first coupling locates the sensor actuator member axially, radially and tangentially with respect to the first clamp whilst permitting the sensor actuator member to move angularly with respect to the first clamp.

3. The device as claimed in claim 1 in which the sensor actuator member is coupled to the second clamp through a second coupling which locates the sensor actuator member radially and tangentially but permits the sensor actuator member to move angularly with respect to the second clamp.

4. The device as claimed in claim 3 in which the second coupling permits the sensor actuator member to move axially with respect to the second clamp.

5. The device as claimed in claim 3 in which one of the first and second couplings is disposed between the first clamp and the second clamp.

6. The device as claimed in claim 5 in which the said one of the first and second couplings is mounted to a limb cantilevered from one of the first and second clamps and extending toward the other of the first and second clamps.

7. The device as claimed in claim 1 comprising a load cell from which the sensor actuator member is cantilevered, the load cell being provided with at least one strain sensor.

8. The device as claimed in claim 1 in which the sensor actuator member passes through a locating arrangement which restricts lateral movement of the sensor actuator member but permits angular movement of the sensor actuator member, and the sensor comprises one or more linear sensors coupled to the sensor actuator member.

9. The device as claimed in claim 1 in which the sensor is responsive to strain of the sensor actuator member.

10. The device as claimed in claim 1 in which the first clamp is connected to the second clamp through at least one grab bar.

11. A device configured for monitoring strain of an elongate member deployed underwater, the device comprising:
    a first clamp configured to embrace and couple to the elongate member at a first axial location,
    a second clamp configured to embrace and couple to the elongate member at a second axial location separated from the first axial location,
    a sensor actuator member coupled to the first clamp and the second clamp, and
    a sensor which is responsive to an angle between the first clamp and the second clamp, wherein the sensor comprises (a) a magnetometer coupled to one of the first clamp and the sensor actuator member, and (b) a magnet coupled to the other of the first clamp and the sensor actuator member.

12. The device as claimed in claim 11 in which the magnetometer is wholly contained in a sealed enclosure.

13. The device as claimed in claim 11, further comprising a compensation magnetometer mounted remotely from the magnet.

14. A device configured for monitoring strain of an elongate member deployed underwater, the device comprising:
    a first clamp configured to embrace and couple to the elongate member at a first axial location,
    a second clamp configured to embrace and couple to the elongate member at a second axial location separated from the first axial location,
    a sensor actuator member coupled to the device by a gimbal mounting, and
    a sensor responsive to rotational position of a part of the gimbal mounting.

15. A device configured for monitoring strain of an elongate member deployed underwater, the device comprising:
    a first clamp configured to embrace and couple to the elongate member at a first axial location,
    a second clamp configured to embrace and couple to the elongate member at a second axial location separated from the first axial location, and
    a sensor which is responsive to an angle between the first clamp and the second clamp, wherein at least one of the first and second clamps comprises a pair of jaws that are spring biased toward the closed configuration and that are pivotally coupled to one another to be movable between open and closed configurations.

16. The device as claimed in claim 15 in which the jaws are each coupled to a grippable lever through which the jaws are able to be opened.

17. A device configured for monitoring strain of an elongate member deployed underwater, the device comprising:
    a first clamp configured to embrace and couple to the elongate member at a first axial location,
    a second clamp configured to embrace and couple to the elongate member at a second axial location separated from the first axial location, and a sensor which is responsive to an angle between the first clamp and the second clamp, wherein the sensor is housed in a sealable pressure vessel that is removable from a remainder of the device.

18. The device as claimed in claim 17 in which the sealable pressure vessel is receivable in a cavity carried by the first clamp, and is configured to form a part turn lock therewith to releasably secure the pressure vessel in position.

* * * * *